United States Patent [19]

Usher et al.

[11] Patent Number: 5,071,258
[45] Date of Patent: Dec. 10, 1991

[54] THERMOCOUPLE ASSEMBLY

[75] Inventors: John D. Usher; Joseph E. Blaze, Beaver, both of Pa.; R. Michael Phillippi, Highland, Md.

[73] Assignee: Vesuvius Crucible Company, Pittsburgh, Pa.

[21] Appl. No.: 649,570

[22] Filed: Feb. 1, 1991

[51] Int. Cl.$^5$ .................... G01K 1/12; G01K 7/02; H01L 35/02; H01L 35/12
[52] U.S. Cl. .................... 374/140; 136/234; 136/232; 374/179
[58] Field of Search .................... 136/230, 231, 232, 233, 136/234; 374/139, 140, 179

[56] References Cited

U.S. PATENT DOCUMENTS

| 1,847,059 | 2/1932 | Beshara | 136/230 |
|---|---|---|---|
| 2,563,931 | 8/1951 | Harrison | 136/233 |
| 3,040,579 | 6/1962 | Taylor | 136/233 |
| 3,306,783 | 2/1967 | Silver | 374/140 |
| 3,379,578 | 4/1968 | McTaggart et al. | 136/234 |
| 3,527,620 | 9/1970 | Meador | 136/231 |
| 3,580,744 | 5/1971 | Inouye et al. | 136/234 |
| 3,802,926 | 4/1974 | Blencowe | 136/232 |
| 3,816,183 | 6/1974 | Kraus | 136/234 |
| 3,922,916 | 12/1975 | Wickert | 374/140 |
| 3,960,604 | 6/1976 | Heitzinger et al. | 136/232 |
| 3,975,212 | 8/1976 | Haupin et al. | 136/234 |
| 4,102,708 | 7/1978 | Dancy | 136/233 |
| 4,216,028 | 8/1980 | Kurita | 136/234 |
| 4,238,957 | 12/1980 | Bailey et al. | 136/232 |
| 4,272,989 | 6/1981 | Rymarchyk et al. | 136/234 |
| 4,377,347 | 3/1983 | Hanmyo et al. | 136/234 |
| 4,430,518 | 2/1984 | Nakajima et al. | 136/234 |
| 4,527,909 | 7/1985 | Dale et al. | 374/163 |
| 4,776,705 | 10/1988 | Najjar et al. | 374/139 |
| 4,778,281 | 10/1988 | Falk | 374/140 |
| 4,871,263 | 10/1989 | Wilson | 374/139 |

FOREIGN PATENT DOCUMENTS

| 2844417 | 3/1980 | Fed. Rep. of Germany | 136/233 |
|---|---|---|---|
| 0821949 | 4/1981 | U.S.S.R. | 374/140 |

Primary Examiner—William A. Cuchlinski, Jr.
Assistant Examiner—Diego F. F. Gutierrez
Attorney, Agent, or Firm—Webb Burden Ziesenheim & Webb

[57] ABSTRACT

A thermocouple assembly for sensing temperatures of molten metals in a metallurgical vessel, such as a tundish used in continuous steel casting, includes a double bore insulator containing the two noble metal alloy lead wires of the thermocouple. Platinum-rhodium alloys are preferred. The weld bead joining the ends of the leads or hot junction of the thermocouple is positioned within one of the bores of the insulator such that a lower purity alloy lead is exposed in the loop. The loop resides in a blind bore formed in the end of the double bore insulator and is enclosed in a containmemt zone by a refractory plug or foil disc closing off the end of the blind bore. The double bore insulator is received in an axial bore of a refractory sheath having a closed end adjacent the loop area of the thermocouple. The bores of the double bore insulator and refractory sheath communicate with the atmosphere to permit oxygen to diffuse therealong to the loop area to protect the platinum alloy from reaction with carbon and silica which may be present in trace amounts. A closed end molybdenum sheath having an axial bore receives the refractory sheath therein. High purity alumina powder is preferably packed around an upper annular space between the bore of the molybdenum sheath and the refractory sheath to prevent diffusion of atmospheric oxygen within the molybdenum bore and thereby minimize the formation of gaseous molybdenum oxide at molten steel temperatures.

22 Claims, 3 Drawing Sheets

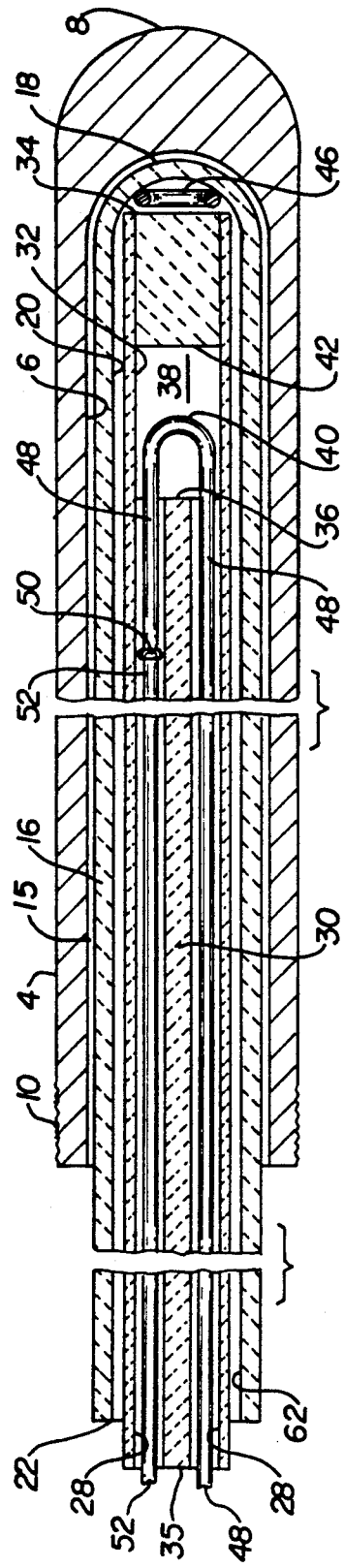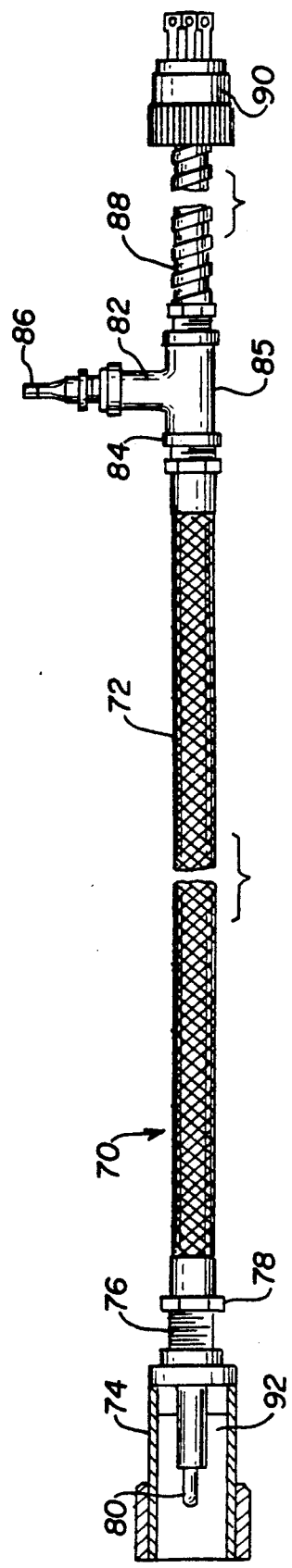
FIG. 5
FIG. 7

THERMOCOUPLE ASSEMBLY

BACKGROUND OF THE INVENTION

The invention relates generally to temperature measurement apparatus and, more particularly, to thermocouple devices for use in continuously sensing the temperature of molten metals, specifically molten steel.

It is desirable in continuous steel casting operations to monitor the temperature of the molten metal in the various metallurgical vessels, such as in the ladle and the tundish. Significant improvements have been made in recent years with respect to the refractory components which ensheathe the thermocouple assembly so as to prolong service life when immersed in a molten metal. Such improved refractory materials for protective thermocouple sheaths are disclosed and claimed in U.S. Pat. No. 4,721,533, Phillippi et al., owned by the assignee of the present invention. Even though these improved refractory materials and components have contributed to increase the service lift of immersion thermocouples, high temperature premature failures still occur due to high temperature chemical reactions occurring along the thermocouple lead wires. In addition, localized condensation of certain compound results in a so-called emf drift of the thermocouple wherein temperature readings become inaccurate. It has been observed in a submerged tundish application of a continuous caster that complete wire fractures or open circuit failures have occurred in the loop area of the thermocouple lead wires after only 10 to 50 hours of operation. A 100-hour service life is desired, as a minimum for this type of metallurgical application.

In prior thermocouple designs, a pair of platinumrhodium alloy lead wires are threaded within a double bore insulator leaving an exposed loop length of wire extending outside one end of the insulator. The double bore insulator and contained lead wires are housed within an alumina sheath having a closed end that encloses the exposed end of lead wire. The alumina sheath is then placed in a closed-end molybdenum sheath. The molybdenum sheath, in turn, is housed in an outer refractory sheath which protects the thermocouple assembly from the molten metal.

In such prior design, the spaces inside the thermocouple probe are packed with high-purity alumina powder. In addition to the annuli between the molybdenum and alumina sheaths, and the alumina sheath and double-bore insulator, the alumina powder is packed in the space above the inner alumina sheath, nearly to the full length of the steel extension pipe which is connected to the molybdenum sheath Furthermore, air flow into the probe head is restricted to seepage around the connector and through slits in the welded pipe joints. Thus, the internal atmosphere within the thermocouple assembly approximated a closed system. A few milligrams of carbon-containing contaminants. Thus, a minute amount, on the order of milligrams or less of carbon containing contaminants introduced, inadvertently or otherwise, inside the probe during assembly has an opportunity to create a reducing atmosphere at the base of the probe. This creates a dangerous environment for the platinum alloy loop, particularly if silica is also present. Silica is present as a naturally occurring trace contaminant in most manufactured ceramics, as well as in the atmosphere of most ceramic manufacturing plants. There is no theoretical barrier preventing the following reaction to proceed until one of the reactants—carbon, silica or platinum—is completely consumed. The reaction set forth below is believed to be responsible for the premature separation of platinum alloy thermocouple wires: $SiO_2 + 2C + XPt = Pt_XSi + 2CO$. The inter-metallic $Pt_XSi$ can have a melting point several hundred degrees lower than steel.

Due to the extremely high temperatures encountered during service, on the order of about 2800°-2900° F., it is theorized that very minute amounts of carbon, possibly present in the alumina powder and in normal handling, along with trace amounts of silica on or in the alumina sheath contribute to chemical attack of the platinum-rhodium thermocouple lead wire. It has been observed by microscopic examination that wire separation has commonly occurred at the grain boundaries of the exposed loop section of wire, wherein silicon containing compounds have been subsequently detected by electron probe and other analytical methods. It is further theorized that the molybdenum along the bore of the molybdenum sheath reacts with oxygen and forms a very mobile gas at molten steel temperatures which subsequently condenses as a solid on the exposed thermocouple lead wires causing subsequent emf drift problems.

It is, therefore, an object of the present invention to provide an improved thermocouple assembly which overcomes the dual problems of rapid open circuit failure and emf drift commonly found in prior devices of this type.

The present invention provides a thermocouple assembly which limits the strength and duration of a reducing atmosphere around the loop region by effectively allowing reducing gases, such as carbon monoxide, to dissipate from the loop region whereby the service life of the platinum-rhodium lead wires is greatly extended. Still further, the present invention provides a thermocouple assembly in which the migration or diffusion of oxygen towards the bore of the molybdenum sheath is extremely slow, so as to minimize the oxidation of molybdenum and the subsequent gaseous transport and deposition which is theorized to occur.

Still further, the invention provides a thermocouple assembly which includes a sacrificial getter element in the loop region therein which further protects the thermocouple lead wires from chemical attack. The loop is further protected by recessing in the end of the double bore insulator and capping the end of the double bore insulator with a noble metal or ceramic.

SUMMARY OF THE INVENTION

The above features, as well as other features and advantages are provided by the present invention. Briefly stated, the improved thermocouple assembly of the invention includes an elongated double bore insulator for holding the lead wires of a thermocouple therein. An end of the double bore insulator adjacent a loop end of the thermocouple lead wires has an axial blind bore formed therein, which defines a containment zone for housing the loop. A refractory plug or metal foil closes off the end of the blind bore to isolate the loop from the exterior of the double bore insulator. A closed-end refractory sheath, preferably of alumina, is fitted over the double bore insulator. The refractory sheath has an axial length substantially the same as the double bore insulator. A rod-shaped molybdenum sheath, having one closed end, receives the refractory tube therein. The molybdenum sheath has a threaded section formed at its second or open end and has an axial length less than the lengths of the refractory sheath and the double bore insulator. A steel extension tube is threadably secured to the second end of the molybdenum sheath and is coaxially aligned with the refractory sheath. An annular region defined between the extension tube and the refractory sheath is packed with a high purity refractory powder, preferably a high purity alumina powder, whereby atmospheric oxygen is prevented from entering the annular region between the refractory sheath and the molybdenum sheath. The open, second ends of the double bore insulator and refractory sheath are exposed to air and thus provide pathways for the migration or diffusion of oxygen therein to create an oxidizing atmosphere in the thermocouple loop region within the containment zone of the double bore insulator and within the bore of the refractory sheath. Such an oxidizing atmosphere protects the platinum-rhodium thermocouple lead wires from possible grain boundary attack by volatile silicon compounds as would otherwise occur in a reducing atmosphere.

A sacrificial getter, preferably in the form of wire or foil of high purity platinum or a platinum-rich alloy, is positioned between the plugged end of the double bore insulator and the closed end of the refractory sheath to provide protection for the thermocouple loop against attack from any trace contaminants such as carbon and silica which might be present.

The weld bead joining the higher and lower purity legs of the platinum-rhodium thermocouple lead wires in the loop area is preferably located in one of the bores of the double insulator so that the lower purity leg is exposed at the loop. This further protects the lead wires since the higher purity lead has shown to be more susceptible to attack than the lower purity lead wire.

An outer sheath of a refractory material is finally positioned around the molybdenum rod to provide protection against immersion in molten metal, such as molten steel in a tundish, for example. The invention also preferably includes nitrogen gas cooling means at the top portion of the thermocouple assembly to protect the steel extension tube and associated mounting elements against thermal degradation.

BRIEF DESCRIPTION OF THE DRAWINGS

In order to gain a better understanding of the invention, attention is directed to the following detailed description taken with the appended drawings in which:

FIG. 5 is an enlarged cross-sectional, side view of a probe assembly of the invention;

FIG. 7 is a side elevation view of a cable and auxiliary fittings used to electrically connect the thermocouple lead wires and to supply a cooling gas to the device depicted in FIG. 6.

DETAILED DESCRIPTION OF THE INVENTION

Figure 1:
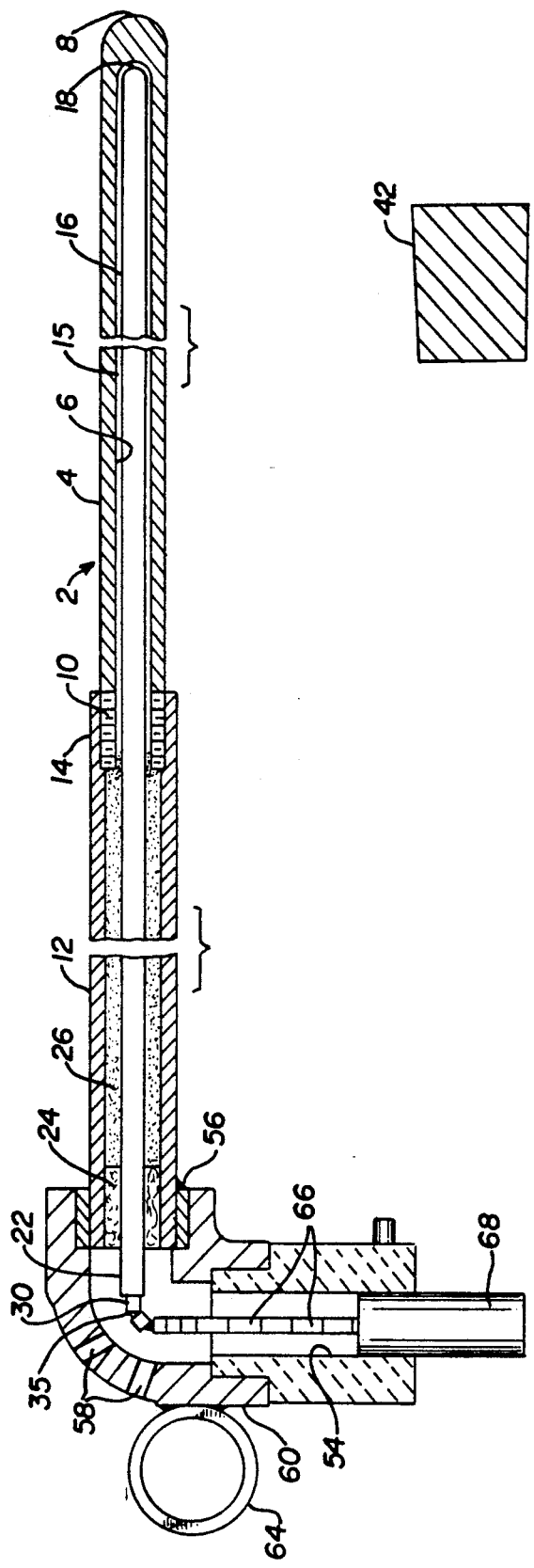
FIG. 1 is a partial cross-sectional, side elevation view of a thermocouple assembly of the invention.

With respect to the drawings, like reference numerals represent like elements throughout the various views, i.e., a thermocouple assembly according to the present invention is identified generally by reference numeral 2. The thermocouple assembly 2 shown in FIG. 1 includes a molybdenum rod or sheath 4 having an axial bore 6 terminating adjacent to a closed end 8. The molybdenum sheath 4 also has a threaded section 10 formed on its outer surface at the open end thereof. A steel extension tube 12 is attached to the threaded section 10 of the molybdenum sheath by way of a mating threaded segment 14 formed along the inside wall of the tube. Generally, the sheath 4 has a length on the order of about 30 inches, while the extension tube 12 is about 15 inches in length.

Figure 6:
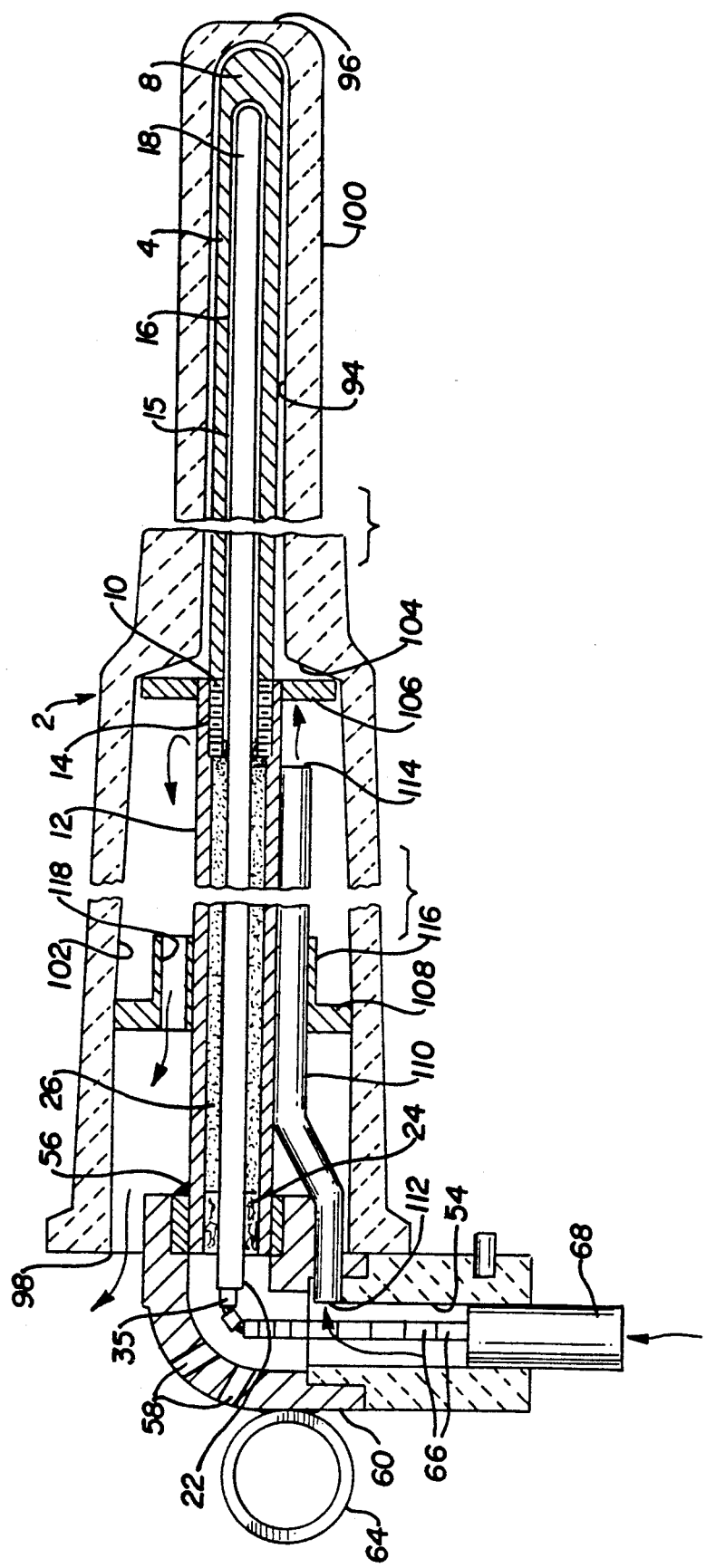
FIG. 6 is a cross-sectional side elevation view of the invention similar to FIG. 1 further including an outer refractory sheath and gas cooling means at a mounting end.

A refractory sheath 16, preferably of alumina ($Al_2O_3$) slidably fits within the bore 6 of the molybdenum sheath 4. The refractory sheath 16 has one closed end 18 and has an axial bore 20 formed therein, FIG. 5. As seen in FIGS. 1 and 6, end 22 of the refractory sheath 16 is positioned outside of the extension tube 12 and is axially held in place by a fiber plug 24 fitted within the end of the extension tube 12. High purity alumina powder 26 is vibra packed into the annular space extending radially between the refractory sheath 16 and steel extension tube 12 and extending longitudinally from the end of the molybdenum rod 4 at threaded portion 10 to the fiber plug 24. The packed refractory powder 26 stabilizes the refractory sheath 16 against movement so as to prevent breakage and also creates a barrier for the migration or diffusion of atmospheric oxygen along the annular space 15 between the bore 6 of the molybdenum sheath 4 and the refractory sheath 16. This barrier feature prevents oxidation of the bore interior of the molybdenum rod 4 which has been heretofore troublesome due to highly reactive nature of molybdenum and oxygen along with the mobile nature of gaseous molybdenum oxide and its suspected role in causing emf drift, as discussed above.

Figure 2:
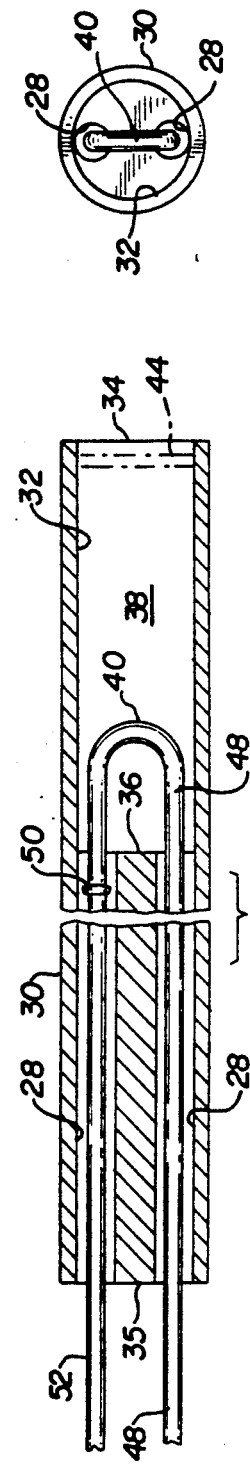
FIG. 2 is an enlarged cross-sectional, side elevation view of a double bore insulator and thermocouple lead wires employed in the present invention.
Figure 3:
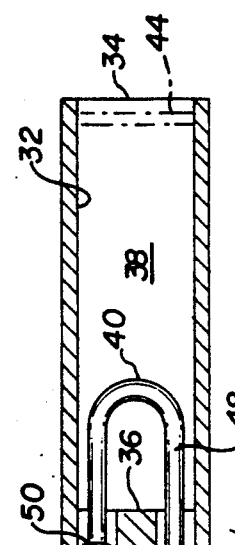
FIG. 3 is an end view of the double bore insulator of FIG. 2.
Figure 4:
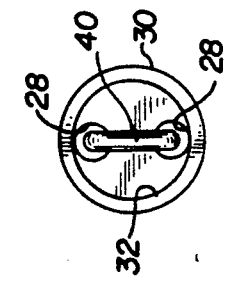
FIG. 4 is a cross-sectional side view of a refractory plug for use in the double bore insulator of FIGS. 2 and 3.

A rod-shaped double bore insulator 30 having a pair of small diameter spaced bores 28 is fitted within the bore 20 of the refractory sheath 16. Insulator 30 is preferably made from a high purity alumina material. The temperature sensing end of the insulator 30 has a blind bore 32 axially formed therein, see FIGS. 2, 3 and 5. The bore 32 extends from the open end 34 of the insulator 30 to the surface 36. The space defined by bore 32 provides an open containment zone 38 for the thermocouple loop 40. A cylindrical plug 42 of a refractory material, such as alumina, is fitted in the open end 34 of the bore 32 of double bore insulator 30 to isolate the thermocouple loop 40 within the containment zone 38. The plug 42 is held within the bore 32 by a tight mechanical fit or by an appropriate high purity alumina adhesive. In place of the plug 42, the end of the bore 32 may also be closed off by a disc 44 of metal foil, such as a high purity platinum alloy foil, for example.

The containment zone 38 provided by the bore 32 and plug 42 or foil 44 permits the thermocouple loop 40 to reside in an enclosed, free space. The containment zone 38 is in communication with atmospheric oxygen by virtue of the bores 28 which extend axially through the insulator 30 to an open end 35 which is exposed to the atmosphere. Thus, a desired oxidizing atmosphere is formed around the thermocouple loop 40 which creates a benign environment for the platinum in the event trace amounts of silica and carbon are present. In addition, the absence of the packed alumina powder from around the lower portions of the thermocouple decreases the likelihood of introducing further carbon contamination, as suspected to occur in the prior art devices which employ packed alumina powder around the thermocouple loop and around the alumina sheath. Even if unavoidable trace amounts of carbon or silica are present, the oxygen pathways provided by bores 28 prevent a harmful reducing atmosphere from forming around the loop 40. As a further measure of protection, a ring-shaped sacrificial getter 46, of high purity platinum 94wt.% - rhodium 6wt.% alloy wire or of pure platinum material is placed in the bore 20 of the refractory sheath 16, preferably located between the end 34 of the double bore insulator 30 and the closed end 18 of the refractory sheath 16, FIG. 5.

In a presently preferred embodiment, the thermocouple assembly 2 of the invention has a positive lead wire 48 of 70 wt.% platinum - 30 wt.% rhodium and a negative lead wire 52 of higher purity platinum alloy, such as, 94wt.% platinum - 6 wt.% rhodium. The ends of the lead wires 48 and 52 are joined at weld bead 50, which is also known in the temperature art as the hot junction of the thermocouple. As seen in FIG. 5, the weld bead 50 is positioned within one of the bores 28, approximately ¾ inch from the end of the insulator 30 so that only the lower purity platinum alloy of the positive lead wire 48 is exposed in the loop 40. It has been observed that grain boundary attack occurs more readily in the higher purity platinum alloy lead wire and less in the lower purity alloy lead, therefore, further protection is provided when the higher purity lead wire 52 is completely shielded within the bore 28. The presence of the higher purity platinum alloy or pure platinum of sacrificial getter 46 also provides a preferential host for contaminant attack over the lower purity lead 48 which is exposed at loop 40. In the event the platinum foil disc 4 is employed, it not only closes off the bore 32, but also acts as a sacrificial getter to protect the loop 40. If a platinum foil disc 44 is employed, there is no need to use the getter ring 46. The foil disc 44 is of a platinum alloy of greater platinum content than the positive lead wire 48 or of a pure platinum material.

The thermocouple assembly 2 also includes an elbow 60 having a bore 54 therethrough formed at a 90° axial configuration. One end of the bore 54 of the elbow 60 is secured to the end of steel tube 12, such as by spot welded beads 56. Preferably three weld beads are formed, spaced 120° apart. The elbow 60 also has several holes 58 formed therethrough to allow atmospheric air to enter the interior bore 54 and thus permit entry of oxygen into the bores 28 of the double bore insulator at end 35 and into the annular space 62 (FIG. 5) between the bore 6 of the refractory sheath 16 and the double bore insulator 30 at the free ends 22 and 35, respectively, which are positioned in the bore 54 of the elbow 60, FIGS. 1 and 6.

The elbow 60 also has a conventional metal ring 64 welded on an exterior surface portion for handling ease. A plurality of double bore insulator segments 66 are fitted around the thermocouple lead wires located within the bore 54 of the elbow and extending from the end 35 of the double bore insulator 30 to a female plug fixture 68 attached to the other end of the elbow 60.

A gas cooled electrical cable assembly, generally designated 70 in FIG. 7, includes an in-line gas/electrical cable segment 72 of known design such as sold under the tradename TITEFLEX. The cable segment 72 includes a plurality of electrical conductors surrounded by an annular gas passage in the interior thereof (not shown). One end of cable segment 70 carries a connector housing 74 attached thereto by a threaded tubular shaft 76 and threaded nut 78. A male plug 80 is connected to the electrical conductors within the cable segment 72 and is adapted to make an electrical connection with the female plug 68 carried by the elbow 60. A "T"-shaped gas fitting 82 is threadably attached at end 84 to the cable segment 72 and is adapted to be coupled at nipple 86 to a source of pressurized cooling gas, such as nitrogen. The fitting 82 permits the electrical leads to pass therethrough via body 85 to an armored, flexible cable segment 88 to a plug element 90. The plug 90 is adapted to be electrically coupled to a conventional thermocouple readout instrument (not shown).

Pressurized gas delivered to the nipple 86 flows through the body 85 of the gas fitting 82 and enters the annular portion of the cable segment 72 whereupon the gas flows into an annular portion 92 of the connector housing 74. The pressurized cooling gas then enters the hollow female plug 68 and the bore 54 of the elbow 60. Back flow of cooling gas is effectively prevented by a suitable 0 ring compression fitting that fits over the cable segment and is attached to the T-shaped gas fitting.

As depicted in FIG. 6, an outer protective sheath 100 preferably of a refractory metal oxide such as an alumina plus graphite material of the type disclosed and claimed in U.S. Pat. No. 4,721,533 referred to above, protects the assembly from the harsh environment of molten metal. Outer sheath 100 has an axial bore 94 with a closed end 96 and an open end 98 to slidably receive the molybdenum sheath 4 therein. The upper region of the bore 94 includes an enlarged diameter portion 102 joined by an tapered shoulder 104. The steel tube 12 has a lower washer-shaped flange 106 attached around its periphery at the threaded end to engage the shoulder 104. A centering member having an annular flange 108 is attached to the tube 12 spaced from the flange 106 to maintain the tube 12 in a coaxial orientation with the bore 102.

A cooling gas delivery tube 110 communicates at a first end 112 with the bore 54 of the elbow 60 and with the enlarged diameter bore 102 of outer sheath 100 at a second end 114. A stream of cooling gas such as nitrogen exiting the plug 68 from cable 70 enters the tube 110 at end 112 and is delivered at end 114 to circulate within the bore 102 and cool the upper region of the thermocouple assembly 2. The centering flange 108 has a hole 116 to permit the passage of tube 110 therethrough and one or more holes 118 to allow the cooling gas to circulate through the washer 108 and exit at the open end 98 of the outer protective sheath 100. An appropriate collar fitting (not shown) joins the upper end 98 of the outer protective sheath 100 to the elbow 60.

By way of actual example, the double bore insulator 30 is preferably formed of relatively high alumina content 99.8% and may have a length on the order of three feet or more, depending upon the particular operational configuration desired. The insulator 30 has a typical diameter of about 0.156 inches with a blind bore 32 diameter of about 0.127 inches, having a depth of about 0.437 inches, as measured from end 34 to surface 36. The bores 28 for containing the leads 48 and 52 are typically about 0.040 inches in diameter. After the plug 42 is positioned in the bore 32, the length of the containment zone 38, as measured from the surface 36 to the inserted plug 42 is about 0.250 inches. The complete assembly 2 depicted in FIG. 6 has an overall length measured from the end 96 to the elbow 60 on the order of about four feet or more.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A thermocouple assembly for the continuous sensing of temperature in a metallurgical vessel comprising:
    a pair of thermocouple lead wires of dissimilar noble metal alloys defining respective positive and negative leads of the thermocouple and joined together at one end by a weld bead, and having an exposed loop adjacent said weld bead, wherein said weld head is the hot junction of the thermocouple;
    a double bore insulator for containing said pair of lead wires in a spaced-apart relationship, said insulator having an axial, blind bore formed at a temperature sensing end thereof whereby said exposed loop is positioned in spaced relation to a floor surface of said blind bore, said insulator also including a second end, said weld bead being positioned within one of the bores of said double bore insulator, and said exposed loop consists of only one of said lead wires;
    closure means for closing off said axial blind bore to isolate said loop in a containment zone defined between said floor surface and said closure means;
    a closed end sheath of a refractory ceramic material having an axial bore receiving said double bore insulator therein and having an open end;
    a closed end molybdenum sheath having an axial bore receiving said refractory sheath therein, and having an open end;
    an extension tube coaxially aligned with the molybdenum sheath and attached at a first end to the open end of said molybdenum sheath, said extension tube having a second end spaced inwardly from the open end of said refractory sheath and the second end of said double bore insulator; and
    high purity refractory ceramic powder packed in said extension tube around said refractory sheath whereby migration of atmospheric oxygen into the bore of the molybdenum sheath is prohibited while migration of atmospheric oxygen is permitted within the bore of said refractory sheath and along the bores of the double bore insulator to said containment zone.

2. The thermocouple assembly of claim 1 including sacrificial getter means positioned adjacent the loop of the lead wires to provide a preferential site for chemical reaction with a trace contaminant which may be present.

3. The thermocouple assembly of claim 2 wherein the thermocouple lead wires are of a platinum-rhodium alloy in which the negative lead is of a higher platinum content than said positive lead.

4. The thermocouple assembly of claim 3 wherein the sacrificial getter comprises a wire ring of platinum-containing material having a platinum content at least as great as said positive lead wire, positioned between said closed off end of the double bore insulator and the closed end of the refractory sheath.

5. The thermocouple assembly of claim 4 wherein the platinum containing material is one selected from the group consisting of platinum-rhodium alloys having a platinum content at least as great as the positive lead wire, and pure platinum.

6. The thermocouple assembly of claim 3 wherein the closure means in said double bore insulator and said sacrificial getter means comprises a foil disc of platinum material having a platinum content at least as great as said positive lead wire.

7. The thermocouple assembly of claim 6 wherein the closure means in said double bore insulator and said sacrificial getter means comprises a foil disc of platinum material having a platinum content at least as great as said positive lead wire.

8. The thermocouple assembly of claim 1 wherein said exposed loop consists of one of said lead wires containing a lower content of said noble metal constituent.

9. The thermocouple assembly of claim 1 including an outer protective sheath of a refractory ceramic material having an axial bore for receiving said molybdenum sheath therein.

10. The assembly of claim 9 wherein the refractory ceramic material of the outer protective sheath is a mixture of a refractory metal oxide and graphite.

11. The assembly of claim 10 wherein the refractory metal oxide is alumina.

12. The thermocouple assembly of claim 1 wherein the closure means in said axial blind bore is a cylindrical plug of a refractory ceramic material.

13. The thermocouple assembly of claim 12 wherein the refractory sheath, the double bore insulator and said cylindrical plug are of an alumina refractory ceramic material.

14. The thermocouple assembly of claim 1 including an elbow member having a bore therein and attached at a first end to the second end of the extension tube wherein the bores of the double bore insulator and the open end of the refractory sheath communicate with the bore of the elbow member, said elbow member further having at least one hole formed therethrough to permit communication between said bore and with an exterior atmosphere whereby oxygen containing atmosphere is introduced to the bores of said double bore insulator and to the bore of said refractory sheath.

15. The thermocouple assembly of claim 14 including an outer protective sheath of a refractory ceramic material having an axial bore receiving said molybdenum sheath therein and adapted to be secured to said elbow member, said elbow member including plug means at a second end thereof, electrically connected to the thermocouple lead wires and having a gas passage chamber formed therein communicating with the bore of the elbow adapted to be connected to a mating plug and cable means to electrically couple therewith and to receive a flow of cooling gas from said mating plug and cable means, and means to direct the flow of cooling gas from the bore of the elbow to an upper region of the bore of the outer protective sheath to cool said extension tube and elbow member.

16. A thermocouple assembly for the continuous sensing of temperature of molten metal in a metallurgical vessel comprising:
   a pair of platinum alloy lead wires, wherein a first of said lead wires has a higher platinum content than a second of said lead wires, said pair of lead wires joined at one end by a weld bead, wherein said weld bead is the hot junction of the thermocouple;
   a double bore insulator for containing said pair of lead wires in a spaced-apart relationship wherein the weld bead is positioned within one of the bores of said double bore insulator, and the second lead wire forming a loop positioned at a temperature sensing end of said double bore insulator;
   a closed end sheath of a refractory ceramic material having an axial bore receiving said double bore insulator therein, wherein the bores of said double bore insulator and the axial bore of said refractory sheath communicate with an exterior atmosphere to provide a presence of atmospheric oxygen around the lead wire loop;
   a sacrificial getter positioned between said loop and the closed end of the refractory sheath, said getter consisting of a platinum material having a higher platinum purity than said exposed thermocouple loop;
   a closed end molybdenum sheath having an axial bore receiving said refractory sheath therein and therebetween; and
   means for closing off an upper annular space between the bore of the molybdenum sheath and said refractory sheath whereby atmospheric oxygen is prevented from entering the bore of said molybdenum sheath.

17. The thermocouple assembly of claim 16 wherein the double bore insulator has an axial blind bore formed in the temperature sensing end thereof, including means for closing off an open end of the blind bore to define an enclosed containment zone for said thermocouple loop.

18. The thermocouple assembly of claim 16 wherein the double bore insulator and refractory sheath are of an alumina material and wherein said means for closing off the upper annular space between the bore of the molybdenum sheath and the refractory sheath is high purity alumina powder.

19. The thermocouple assembly of claim 16 including an outer protective sheath of a refractory metal oxide-graphite material having an axial bore receiving said molybdenum sheath therein.

20. The thermocouple assembly of claim 19 including a steel extension tube attached at a first end to an open end of the molybdenum tube and attached at a second end to an elbow member, said elbow member having a bore therein communicating with end portions of said double bore insulator and said refractory sheath, said elbow having at least one hole formed therethrough to permit communication of said bore with the exterior atmosphere whereby atmospheric oxygen can diffuse into the bores of said double bore insulator and into the bore of said refractory sheath.

21. The thermocouple assembly of claim 20 including means for introducing and circulating a cooling gas within an upper portion of the bore of the outer protective sheath and around said steel extension tube.

22. A thermocouple assembly for the continuous sensing of temperature in a metallurgical vessel comprising:
   a pair of thermocouple lead wires of dissimilar platinum metal alloys defining respective positive and negative leads of the thermocouple and joined together at one end by a weld bead; and an exposed loop adjacent said weld bead, wherein said weld bead is the hot junction of the thermocouple;
   a double bore insulator for containing said pair of lead wires in a spaced-apart relationship, said insulator having an axial, blind bore formed at a temperature sensing end thereof whereby said loop is adjacent to and in spaced relation to a floor surface of said blind bore, said insulator also including a second end spaced from said temperature sensing end and said weld bead positioned within one of said bores of the double bore insulator such that one of the lead wires of a lower platinum content forms the exposed loop;
   closure means for closing off said axial blind bore to isolate said loop in a containment zone defined between said floor surface and said closure means;
   a closed end sheath of a refractory ceramic material having an axial bore receiving said double bore insulator therein and having an open end spaced a distance from the closed end thereof;
   a sacrificial getter of a platinum alloy material having a platinum content greater than that of the exposed loop, said getter positioned between said closure means of the double bore insulator and the closed end of the refractory sheath;
   a closed end molybdenum sheath having an axial bore receiving said refractory sheath therein, and having an open end;
   an extension tube coaxially aligned with the molybdenum sheath and attached at a first end to the open end of said molybdenum sheath, said extension tube having a second end spaced inwardly from the open end of said refractory sheath and the second end of said double bore insulator;
   high purity refractory ceramic powder packed in said extension tube around said refractory sheath whereby migration of atmospheric oxygen into the bore of the molybdenum sheath is prohibited while a migration of atmospheric oxygen is permitted within the bore of said refractory sheath and along the bores of the double bore insulator to said containment zone; and
   an outer protective sheath of a refractory ceramic material having an axial bore for receiving said molybdenum sheath therein.

* * * * *

UNITED STATES PATENT AND TRADEMARK OFFICE
CERTIFICATE OF CORRECTION

PATENT NO. : 5,071,258

DATED : December 10, 1991

INVENTOR(S) : John D. Usher, Joseph E. Blaze and R. Michael Phillippi

It is certified that error appears in the above-identified patent and that said Letters Patent is hereby corrected as shown below:

Column 1 Line 21 "lift" should read --life--.

Column 1 Line 25 "compound" should read --compounds--.

Column 1 Lines 34-35 "platinumr-hodium" should read --platinum-rhodium--.

Column 1 Lines 56-57 delete "A few milligrams of carbon-containing contaminants."

Column 1 Lines 58 before "milligrams" insert --a few--.

Column 4 Line 39 after "to" insert --the--.

Column 5 Line 14 "94wt.%" should read --94 wt.%--.

Column 5 Line 14 "6wt.%" should read --6 wt.%--.

UNITED STATES PATENT AND TRADEMARK OFFICE
CERTIFICATE OF CORRECTION

PATENT NO. : 5,071,258            Page 2 of 2

DATED : December 10, 1991

INVENTOR(S) : John D. Usher, Joseph E. Blaze and R. Michael Phillippi

It is certified that error appears in the above-identified patent and that said Letters Patent is hereby corrected as shown below:

Column 5 Line 23 "94wt.%" should read --94 wt.%--.

Column 5 Line 40 "4" should read --44--.

Column 6 Line 39 "an" should read --a--.

Claim 1 Line 25 Column 7 "head" should read --bead--.

Signed and Sealed this

Thirtieth Day of March, 1993

*Attest:*

STEPHEN G. KUNIN

*Attesting Officer*      *Acting Commissioner of Patents and Trademarks*